(12) United States Patent
Xu et al.

(10) Patent No.: US 12,054,100 B2
(45) Date of Patent: Aug. 6, 2024

(54) IN-VEHICLE DISPLAY DEVICE, IN-VEHICLE DISPLAY SYSTEM, AND VEHICLE

(71) Applicant: WUHAN CHINA STAR OPTOELECTRONICS TECHNOLOGY CO., LTD., Hubei (CN)

(72) Inventors: Chengcheng Xu, Hubei (CN); Qiang He, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/596,883

(22) PCT Filed: Nov. 26, 2021

(86) PCT No.: PCT/CN2021/133335
§ 371 (c)(1),
(2) Date: Dec. 20, 2021

(87) PCT Pub. No.: WO2023/087362
PCT Pub. Date: May 25, 2023

(65) Prior Publication Data
US 2024/0140312 A1 May 2, 2024

(30) Foreign Application Priority Data
Nov. 16, 2021 (CN) .......................... 202111355803.5

(51) Int. Cl.
*B60R 1/27* (2022.01)
*B60K 35/00* (2024.01)
*B60R 16/02* (2006.01)

(52) U.S. Cl.
CPC ................ *B60R 1/27* (2022.01); *B60K 35/00* (2013.01); *B60R 16/02* (2013.01);
(Continued)

(58) Field of Classification Search
None
See application file for complete search history.

(56) References Cited

U.S. PATENT DOCUMENTS

2017/0329142 A1* 11/2017 Ye .......................... B60K 35/50
2021/0364810 A1* 11/2021 Kim ........................ G09G 3/001

FOREIGN PATENT DOCUMENTS

| CN | 101253067 A | 8/2008 |
|---|---|---|
| CN | 105774679 A | 7/2016 |

(Continued)

OTHER PUBLICATIONS

International Search Report in International application No. PCT/CN2021/133335, mailed on May 27, 2022.
(Continued)

*Primary Examiner* — Rebecca A Volentine

(57) ABSTRACT

The present invention provides an in-vehicle display device, an in-vehicle display system, and a vehicle. The in-vehicle display device includes a display panel and an optical module. In a top view of the in-vehicle display device, a distance between the optical module and a left edge of the display panel or a distance between the optical module and a right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

(Continued)

a distance between the optical module and an upper edge of the display panel is from 0 to $$\frac{b}{2} + \frac{L\tan\left(\frac{\beta}{2}\right) - \frac{L''}{2}}{\cos\theta},$$

and a distance between the optical module and a lower edge of the display panel is from $$\frac{b}{2} - \frac{L\tan\left(\frac{\beta}{2}\right) - \frac{L''}{2}}{\cos\theta}$$

to b.

20 Claims, 7 Drawing Sheets

(52) U.S. Cl.
CPC .... *B60K 2360/176* (2024.01); *B60K 2360/21* (2024.01); *B60K 2360/48* (2024.01); *B60R 2300/10* (2013.01); *B60R 2300/20* (2013.01); *B60R 2300/802* (2013.01); *B60Y 2400/3015* (2013.01)

(56) References Cited

FOREIGN PATENT DOCUMENTS

| | | |
|---|---|---|
| CN | 106873160 A | 6/2017 |
| CN | 108501722 A | 9/2018 |
| CN | 208344074 U | 1/2019 |
| CN | 110579879 A | 12/2019 |
| CN | 111824036 A | 10/2020 |
| JP | 2021045990 A | 3/2021 |
| JP | 2021113013 A | 8/2021 |
| WO | 2017090319 A1 | 6/2017 |
| WO | 2020158602 A1 | 8/2020 |

OTHER PUBLICATIONS

Written Opinion of the International Search Authority in International application No. PCT/CN2021/133335, mailed on May 27, 2022.
Japanese Office Action issued in corresponding Japanese Patent Application No. 特願 2021-571377 dated Dec. 19, 2023, pp. 1-6.
Japanese Office Action issued in corresponding Japanese Patent Application No. 特願 2021-571377 dated May 21, 2024, pp. 1-8.

* cited by examiner

IN-VEHICLE DISPLAY DEVICE, IN-VEHICLE DISPLAY SYSTEM, AND VEHICLE

FIELD OF DISCLOSURE

The present invention relates to a field of in-vehicle display technology and in particular, to an in-vehicle display device, an in-vehicle display system, and a vehicle.

DESCRIPTION OF RELATED ART

In recent years, intelligent vehicle safety has received extensive attention. Driver monitor systems (DMS) are mainly used to monitor driver fatigue. As autonomous driving, internet of vehicles, and related technologies are more and more mature, and because more functions are developed, DMS requires an optical module and a display panel to be installed cooperatively. It is significantly important regarding how to set a position of the optical module in an in-vehicle display device to facilitate information collection and monitor interaction.

Therefore, there is an urgent need to provide an in-vehicle display device, an in-vehicle display system, and a vehicle to solve the above technical problems.

SUMMARY

The present invention provides an in-vehicle display device, an in-vehicle display system, and a vehicle, which can alleviate a problem in selecting a position of an optical module in the in-vehicle display device.

Accordingly, the present application provides technical solutions as follows.

The present application provides an in-vehicle display device, wherein the in-vehicle display device comprises a display panel and an optical module;

wherein in a top view of the in-vehicle display device, a distance between the optical module and a left edge of the display panel or a distance between the optical module and a right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

a distance between the optical module and an upper edge of the display panel is from 0 to $$\frac{b}{2} + \frac{L\tan\left(\frac{\beta}{2}\right) - \frac{L''}{2}}{\cos\theta},$$

and a distance between the optical module and a lower edge of the display panel is from $$\frac{b}{2} - \frac{L\tan\left(\frac{\beta}{2}\right) - \frac{L''}{2}}{\cos\theta}$$

to b, wherein L is a distance between the optical module and a geometric center of a headrest of a driving seat, L' is a normalized width of a driver's head in a horizontal direction, L" is a normalized length of the driver's head in a vertical direction, $\alpha$ is a horizontal viewing angle of the optical module, $\beta$ is a vertical viewing angle of the optical module, $\theta$ is an arrangement angle between the in-vehicle display device and a vertical plane, a is a normalized length of the display panel in the horizontal direction, and b is a normalized length of the display panel in a direction perpendicular to the horizontal direction in a plane where the display panel is located.

Preferably, the optical module is arranged on one side of the display panel away from the headrest of the driving seat, and a normal line of a light-receiving surface of the optical module is parallel to a normal line of a display surface of the display panel.

Preferably, in a top view of the in-vehicle display device, the display panel comprises a first symmetry axis, the first symmetry axis passing through a geometric center of the display panel and is perpendicular to the lower edge of the display panel, and the optical module is disposed in the first symmetry axis.

Preferably, in the top view of the in-vehicle display device, a distance between the optical module and the geometric center of the display panel is greater than the distance between the optical module and the upper edge of the display panel.

Preferably, in the top view of the in-vehicle display device, the distance between the optical module and the left edge of the display panel or the distance between the optical module and the right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

and the distance between the optical module and the upper edge of the display panel or the distance between the optical module and the lower edge of the display panel is from $$\frac{b}{2} - \frac{L\tan\left(\frac{\beta}{2}\right) - \frac{L''}{2}}{\cos\theta}$$

to $$\frac{b}{2} + \frac{L\tan\left(\frac{\beta}{2}\right) - \frac{L''}{2}}{\cos\theta}.$$

Preferably, the in-vehicle display device is inclined in a direction away from the headrest of the driving seat, and $\theta$ is 0° to 20°.

Preferably, $\alpha$ is 30° to 60°, and $\beta$ is 20° to 40°.

Preferably, the optical module comprises any one of a visible light camera, an infrared camera, and a distance sensor.

Preferably, the optical module is installed in a first area and a second area, the first area and the second area are both an isosceles triangle, a base of the isosceles triangle is parallel to the lower edge of the display panel, and an intersection of two congruent sides of the isosceles triangle is a geometric center of the display panel.

The present application provides an in-vehicle display system, comprising an in-vehicle display device, wherein the in-vehicle display device comprises a display panel and an optical module;
  wherein in a top view of the in-vehicle display device, a distance between the optical module and a left edge of the display panel or a distance between the optical module and a right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) + \frac{L'}{2},$$

a distance between the optical module and an upper edge of the display panel is from 0 to $$\frac{b}{2} + \frac{L\tan\left(\frac{\beta}{2}\right) - \frac{L''}{2}}{\cos\theta},$$

and a distance between the optical module and a lower edge of the display panel is from $$\frac{b}{2} - \frac{L\tan\left(\frac{\beta}{2}\right) - \frac{L''}{2}}{\cos\theta}$$

to b, wherein L is a distance between the optical module and a geometric center of a headrest of a driving seat, L' is a normalized width of a driver's head in a horizontal direction, L" is a normalized length of the driver's head in a vertical direction, $\alpha$ is a horizontal viewing angle of the optical module, $\beta$ is a vertical viewing angle of the optical module, $\theta$ is an arrangement angle between the in-vehicle display device and a vertical plane, $\alpha$ is a normalized length of the display panel in the horizontal direction, and b is a normalized length of the display panel in a direction perpendicular to the horizontal direction in a plane where the display panel is located;
  wherein the in-vehicle display system also comprises an electronic control unit connected to the in-vehicle display device for controlling interaction between the in-vehicle display device and other components.

Preferably, the in-vehicle display system further comprises a driving assistance system, the driving assistance system is connected to the electronic control unit and configured to collect vehicle surrounding environment information and display the vehicle surrounding environment information through the in-vehicle display device.

Preferably, the in-vehicle display system further comprises a vehicle information interaction unit, the vehicle information interaction unit is connected to the electronic control unit through a vehicle bus, and the vehicle information interaction unit is configured to transmit vehicle information and display the vehicle information through the in-vehicle display device.

The present application further provides a vehicle, comprising a cabin and an in-vehicle display device, wherein the in-vehicle display device is arranged in the cabin;
  wherein the in-vehicle display device comprises a display panel and an optical module;
  wherein in a top view of the in-vehicle display device, a distance between the optical module and a left edge of the display panel or a distance between the optical module and a right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) + \frac{L'}{2},$$

a distance between the optical module and an upper edge of the display panel is from 0 to $$\frac{b}{2} + \frac{L\tan\left(\frac{\beta}{2}\right) - \frac{L''}{2}}{\cos\theta},$$

and a distance between the optical module and a lower edge of the display panel is from $$\frac{b}{2} - \frac{L\tan\left(\frac{\beta}{2}\right) - \frac{L''}{2}}{\cos\theta}$$

to b, wherein L is a distance between the optical module and a geometric center of a headrest of a driving seat, L' is a normalized width of a driver's head in a horizontal direction, L" is a normalized length of the driver's head in a vertical direction, $\alpha$ is a horizontal viewing angle of the optical module, $\beta$ is a vertical viewing angle of the optical module, $\theta$ is an arrangement angle between the in-vehicle display device and a vertical plane, $\alpha$ is a normalized length of the display panel in the horizontal direction, and b is a normalized length of the display panel in a direction perpendicular to the horizontal direction in a plane where the display panel is located.

Preferably, the optical module is arranged on one side of the display panel away from the headrest of the driving seat, and a normal line of a light-receiving surface of the optical module is parallel to a normal line of a display surface of the display panel.

Preferably, in a top view of the in-vehicle display device, the display panel comprises a first symmetry axis, the first symmetry axis passing through a geometric center of the display panel and is perpendicular to the lower edge of the display panel, and the optical module is disposed in the first symmetry axis.

Preferably, in the top view of the in-vehicle display device, a distance between the optical module and the geometric center of the display panel is greater than the distance between the optical module and the upper edge of the display panel.

Preferably, in the top view of the in-vehicle display device, the distance between the optical module and the left edge of the display panel or the distance between the optical module and the right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

and the distance between the optical module and the upper edge of the display panel or the distance between the optical module and the lower edge of the display panel is from $$\frac{b}{2} - \frac{L\tan\left(\frac{\beta}{2}\right) - \frac{L''}{2}}{\cos\theta}$$

to $$\frac{b}{2} + \frac{L\tan\left(\frac{\beta}{2}\right) - \frac{L''}{2}}{\cos\theta}.$$

Preferably, α is 30° to 60°, and β is 20° to 40°.

Preferably, the optical module comprises any one of a visible light camera, an infrared camera, and a distance sensor.

Preferably, the cabin comprises an instrument panel located in front of the driver, and the in-vehicle display device is disposed on the instrument panel.

Advantages of the present application:

According to the distance between the optical module and the headrest of the driving seat, the viewing angle of the optical module, the normalized size of the driver's head, the arrangement angle of the in-vehicle display device, and scene modeling, the present invention plans an installed position of the optical model in the in-vehicle display device, thereby facilitating gathering information and monitoring interaction, improving driving safety of a driver, and improving traffic safety.

DETAILED DESCRIPTION OF EMBODIMENTS

Figure 1:
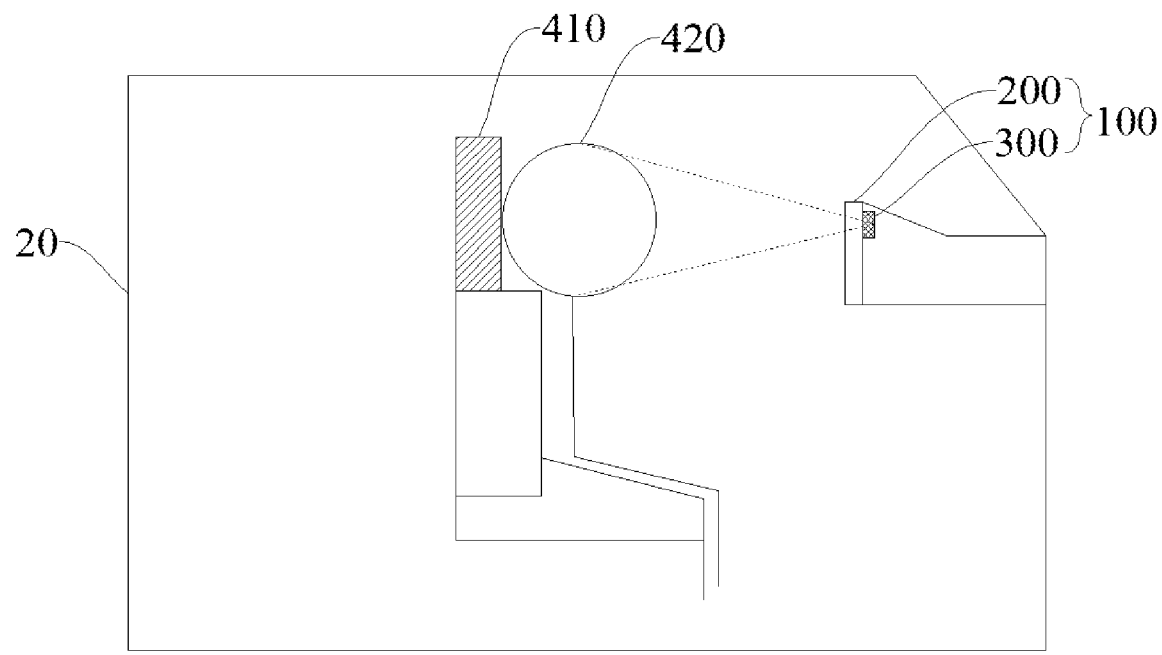
FIG. 1 is a schematic view illustrating an actual scene modeling of an in-vehicle display device according to one embodiment of the present invention.

The present application provides an in-vehicle display device, an in-vehicle display system, and a vehicle. In order to make the purposes, technical solutions, and functions of the present application clearer, the present application is described in detail below with reference to the accompanying drawings and specific embodiments. It should be understood that the specific embodiments described here are only used to explain the present application, and are not used to limit the present application.

The present application provides an in-vehicle display device, an in-vehicle display system, and a vehicle. Detailed descriptions are provided below. It should be noted that an order of describing the following embodiments is not intended to limit a preferred order of the embodiments.

Please refer to FIGS. 1 to 10. The present application provides an in-vehicle display device 100, wherein the in-vehicle display device 100 comprises a display panel 200 and an optical module 300.

In a top view of the in-vehicle display device 100, a distance between the optical module 300 and a left edge of the display panel 200 or a distance between the optical module 300 and a right edge of the display panel 200 is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

a distance between the optical module 300 and an upper edge of the display panel 200 is from 0 to $$\frac{b}{2} + \frac{L\tan\left(\frac{\beta}{2}\right) - \frac{L''}{2}}{\cos\theta},$$

and a distance between the optical module 300 and a lower edge of the display panel 200 is from $$\frac{b}{2} - \frac{L\tan\left(\frac{\beta}{2}\right) - \frac{L''}{2}}{\cos\theta}$$

to b, wherein L is a distance between the optical module 300 and a geometric center of a headrest 410 of a driving seat, L' is a normalized width of a driver's head 420 in a horizontal direction, L" is a normalized length of the driver's head in a vertical direction, α is a horizontal viewing angle of the optical module 300, β is a vertical viewing angle of the optical module 300, θ is an arrangement angle between the in-vehicle display device 100 and a vertical plane, a is a normalized length of the display panel 200 in the horizontal direction, and b is a normalized length of the display panel 200 in a direction perpendicular to the horizontal direction in a plane where the display panel 200 is located.

According to the distance between the optical module 300 and the headrest 410 of the driving seat, the viewing angle of the optical module 300, the normalized size of the driver's head 420, the arrangement angle of the in-vehicle display device 100, and scene modeling, the present invention plans an installed position of the optical model 300 in the in-vehicle display device 100, thereby facilitating gathering information and monitoring interaction, improving driving safety of a driver, and improving traffic safety.

The technical solution of the present invention is described in conjunction with specific embodiments.

Main functions of a driver monitor system (DMS) comprise fatigue monitoring, distraction monitoring, and dangerous behavior monitoring.

Fatigue monitoring: During driving, a camera samples the driver's closing eye and yawning behaviors. The DMS combines factors such as driving time and driving speed to determine whether the driver is fatigued and a fatigue level. According to the fatigue level, the system sends corresponding warnings to the driver, such as sound warnings, voice warnings, seat belt tightening warnings, and instrument warnings.

Distraction monitoring: During driving, the camera samples driver's eye-position deviations and face-angle deviations; determines according to a deviation angle threshold. Timing is started once the deviation angle threshold is met, distraction levels are determined according to a length of distraction time, and corresponding prompts are given, such as sound warnings, voice warnings, seat belt tightening warnings, and instrument warnings.

Dangerous behavior monitoring: dangerous behavior detection comprises behaviors such as smoking, calling, and eating behaviors of the driver. In the present embodiment, the in-vehicle display device 100 comprises a display panel 200 and an optical module 300, and the optical module 300 is disposed on one side away from a light emitting direction of the display panel 200.

In some embodiments, the optical module 300 is disposed under a screen of the display panel 200 and is configured as an under-screen optical module, which can bring better integrated display effects to the in-vehicle display device 100. When the screen is in an off state or does not display images, it is helpful to improve a black integrated appearance.

Please refer to FIG. 1. In some embodiments, in order to define a position of the optical module 300 on the display panel 200, the optical module 300 needs to collect all optical information of the driver's chin to a top of a forehead, that is, all optical information of the driver's head 420. Viewing angles of the optical module 300 comprise horizontal and vertical angles, a vehicle cabin is modeled in horizontal and vertical directions. Please refer to FIG. 2.

Figure 2:
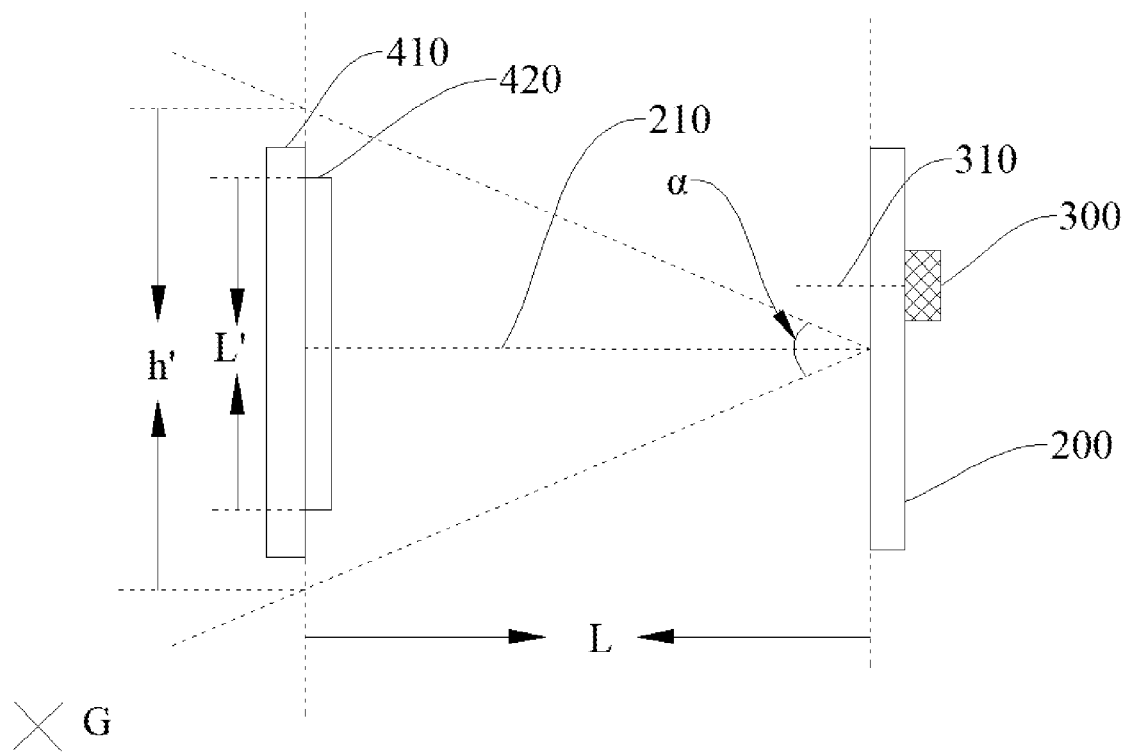
FIG. 2 is a first modeling view of the in-vehicle display device according to one embodiment of the present invention.

FIG. 2 is a modeling view in the horizontal direction.

Figure 3:
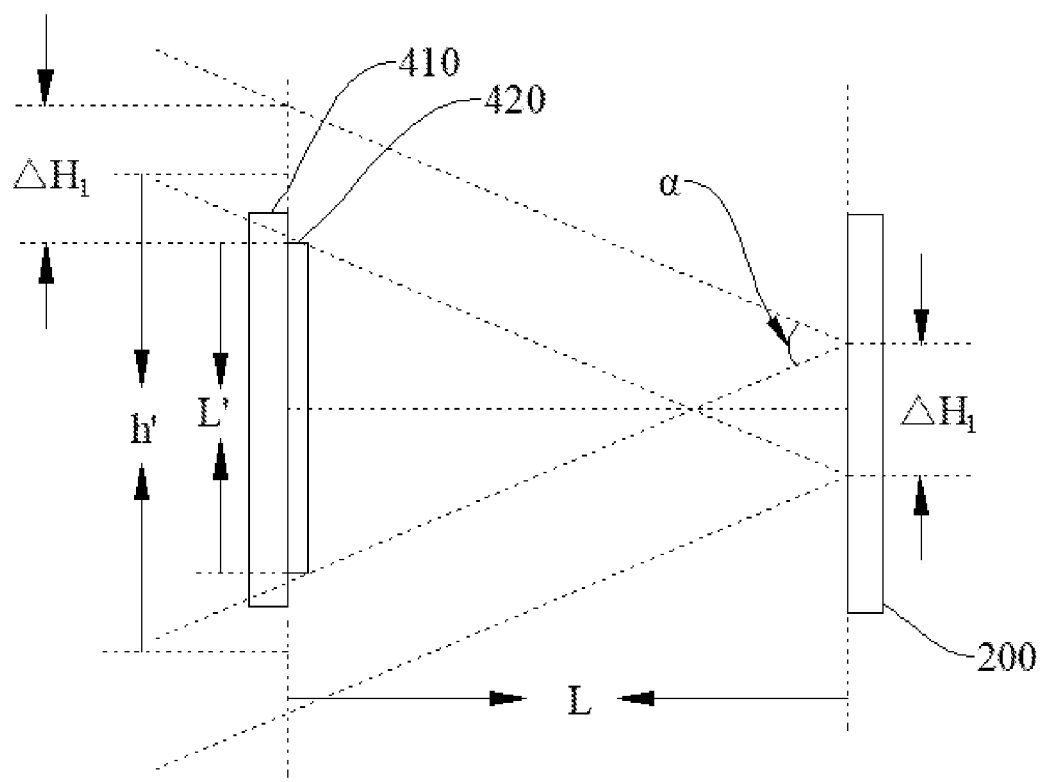
FIG. 3 is a second modeling view of the in-vehicle display device according to one embodiment of the present invention.

Please refer to FIG. 3 which is an example in the horizontal direction. In the drawing, G represents a direction of gravity, an arrow of G represents the vertical direction, ×G represents the horizontal direction, and a is the horizontal viewing angle of the optical module 300. L' is the normalized width of the driver's head 420 in the horizontal direction, and the vertical distance L from the geometric center of the headrest 410 of the driving seat to the display panel 200 substitutes a distance from the driver's head to the display panel 200. In this case, the driver's head needs to be within a horizontal viewing range of the optical module 300. That is to say, the horizontal viewing range of the optical module 300 is h'=2Ltan(α/2). When the position of the optical module 300 is moved left and right, a horizontal position range of the optical module 300, which is ΔH1=h'−L'=22Ltan(a/2)−L", is obtained when considering extreme boundaries.

Figure 4:
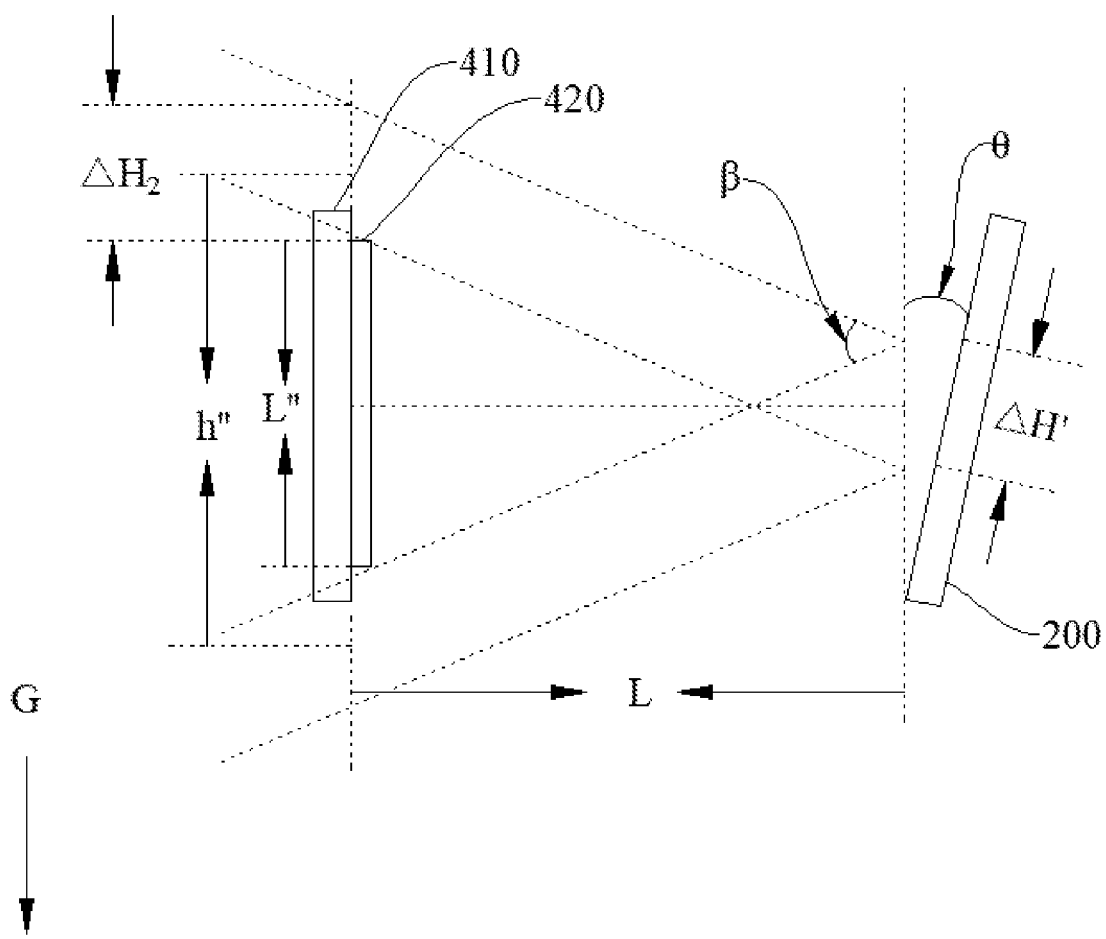
FIG. 4 is a third modeling view of the in-vehicle display device according to one embodiment of the present invention.

Please refer to FIG. 4. FIG. 4 is an example in the vertical direction. β is the vertical viewing angle of the optical module 300, L" is the normalized length of the driver's head 420 in the vertical direction, and the vertical distance L from the geometric center of the headrest 410 of the driving seat to the display panel 200 substitutes the distance between the driver's head and the display panel 200. In this case, the driver's head needs to be within a vertical viewing range of the optical module 300. That is to say, the vertical viewing range of the optical module 300 is h"=2Ltan(β/3)−L". When the position of the optical module 300 is moved up and down, a vertical position range of the optical module 300, which is ΔH2=h"−L"−=2Ltan(β/2)−L", is obtained when considering the extreme boundaries. The in-vehicle display device 100 is sometimes tilted, so the display panel 200 can have a tilt angle θ with respect to the vertical direction, and the tilt angle θ is as shown in FIG. 4. The vertical position range of the optical module 300 on the display panel 200 needs to be corrected to be ΔH'=ΔH2/

$$\cos\theta = \frac{2L\tan\left(\frac{\beta}{2}\right) - L''}{\cos\theta}.$$

Figure 5:
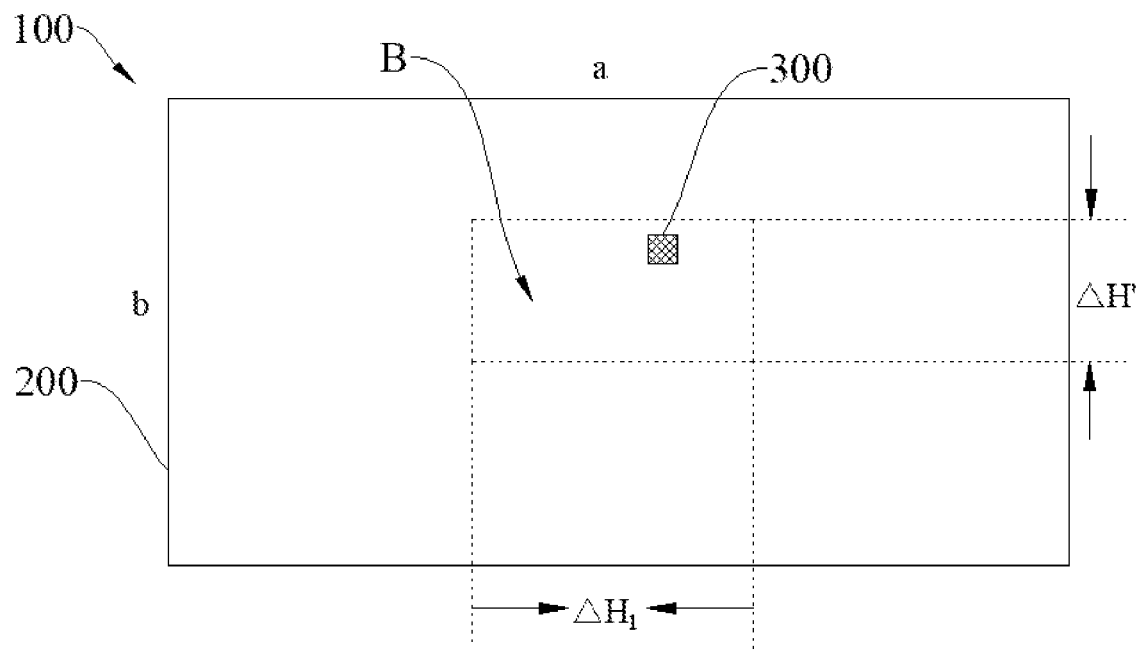
FIG. 5 is a first top view of the in-vehicle display device according to one embodiment of the present invention.

Please refer to FIG. 5, through modeling and calculation, an installation area of the optical module 300 is obtained, and the obtained installation area of the optical module 300 is denoted by B.

Referring to FIGS. 5 to 9, the geometric center of the display panel 200 is denoted by A.

In some embodiments, considering that the in-vehicle display device 100 is sometimes disposed on an instrument panel 30 and there is a steering wheel between the instrument panel 30 and the driver's head 420, a positional relationship between the optical module 300 and the steering wheel also needs to be taken into consideration. Generally, middle and upper regions of the display panel 200 have a higher light transmittance. When placing the optical module 300, a bottom boundary, a left boundary, and a right boundary for the optical module 300 can be set using the geometric center of the display panel 200 as an origin, so that the placement can be done considering left, right, and bottom three directions. When an upper boundary for the optical module 300 is set, the optical module 300 can also be installed close to the upper edge of the display panel 200. In an extreme case, the optical module 300 can be arranged on the upper edge of the display panel 200.

Figure 6:
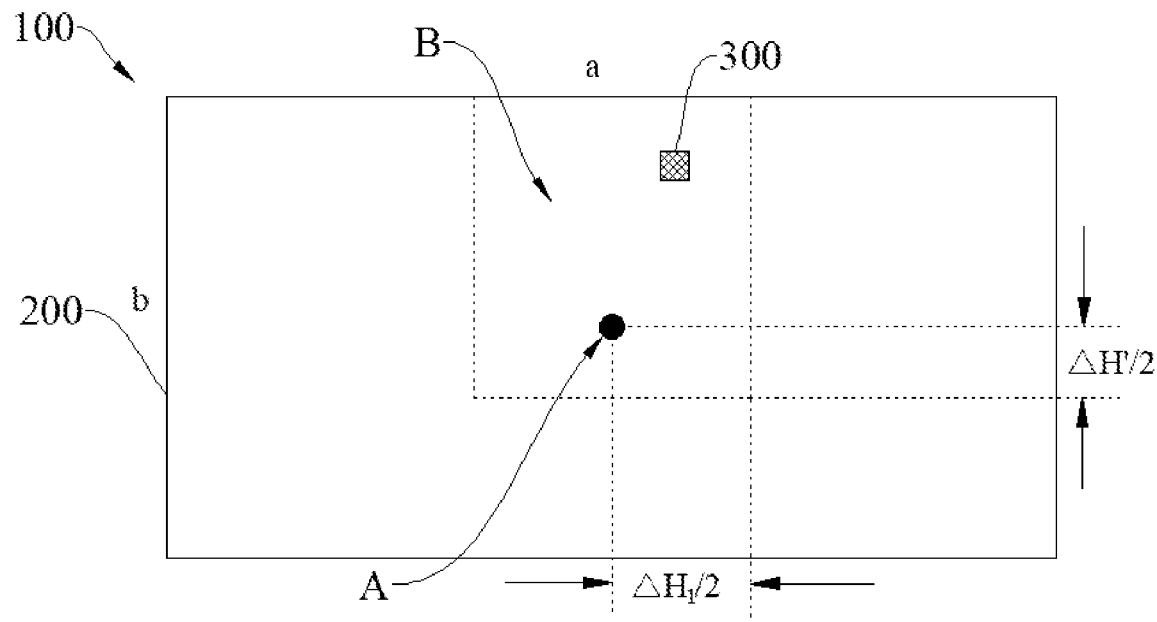
FIG. 6 is a second top view of the in-vehicle display device according to one embodiment of the present invention.

Please refer to FIG. 6. In the top view of the in-vehicle display device 100, the distance between the optical module 300 and the left edge of the display panel 200 or the distance between the optical module 300 and the right edge of the display panel 200 is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2}.$$

The distance between the optical module 300 and the upper edge of the display panel 200 is from 0 to $$\frac{b}{2} + \frac{L\tan\left(\frac{\beta}{2}\right) - \frac{L''}{2}}{\cos\theta}.$$

The distance between the optical module 300 and the lower edge of the display panel 200 is from $$\frac{b}{2} - \frac{L\tan\left(\frac{\beta}{2}\right) - \frac{L''}{2}}{\cos\theta}$$

to b. L is the distance between the optical module 300 and the geometric center of the headrest 410 of the driving seat. L' is the normalized width of the driver's head 420 in the horizontal direction, L" is the normalized length of the driver's head 420 in the vertical direction, and a is the horizontal viewing angle of the optical module 300, β is the vertical viewing angle of the optical module 300, θ is the arrangement angle between the in-vehicle display device 100 and the vertical plane, a is the normalized length of the display panel 200 in the horizontal direction, and b is the normalized length of the display panel 200 in a direction perpendicular to the horizontal direction in the plane where the display panel is located.

In some embodiments, L' is the normalized width of the driver's head 420 in the horizontal direction, and L" is the normalized length of the driver's head 420 in the vertical direction. The normalized width of the driver's head 420 in the horizontal direction can be 15.0 cm to 15.5 cm, with an average value of 15.4 cm. The normalized length of the driver's head 420 in the vertical direction can be 22.0 cm to 22.5 cm, with an average value of 22.3 cm.

Please refer to FIG. 2. In some embodiments, the optical module 300 is an under-screen optical module 300 of the display panel 200, and the optical module 300 is disposed on one side of the display panel 200 away from the headrest of the driving seat. A normal line of a light-receiving surface of the optical module 300 is parallel to a normal line of a display surface of the display panel 200. The optical module 300 is disposed on one side of the display panel 200 close to a light-emitting side. The normal line of the light-receiving surface of the optical module 300 is represented by a dashed line 310, and the normal line of the display surface of the display panel 200 is represented by a dashed line 210. When the display panel 200 has an inclination angle with respect to the vertical direction, the optical module 300 also has an inclination angle with respect to the vertical direction. The optical module 300 is assembled with the display panel 200, and therefore the present application facilitates module integral, reduces component space, and improves integration.

In some embodiments, a shape of the display panel 200 can be regular or irregular. At least one side of the display panel 200 is parallel to the horizontal direction. In practice, at least the lower edge of the display panel 200 is parallel to the horizontal direction. Here, the shape of the display panel 200 can be normalized and takes a rectangle as an example for ease of explanation.

Figure 7:
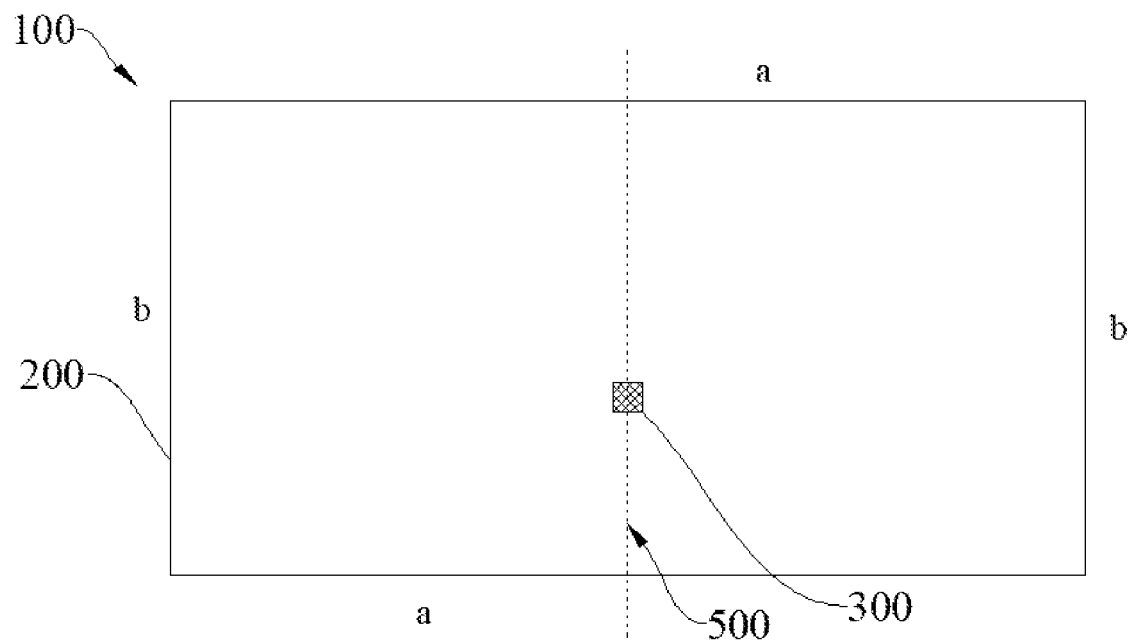
FIG. 7 is a third top view of the in-vehicle display device according to one embodiment of the present invention.

Please refer to FIG. 7. In some embodiments, in the top view of the in-vehicle display device 100, the display panel 200 comprises a first symmetry axis 500 that passes through the geometric center of the display panel 200 and is perpendicular to the lower edge of the display panel 200. The optical module 300 is disposed on the first symmetry axis 500.

When the display panel 200 is rectangular, the first symmetry axis 500 is a line connecting a midpoint of the upper edge and a midpoint of the lower edge. Generally, the display panel 200 has a left-right symmetrical shape and is arranged on a left-right symmetrical axis of the display panel 200, which is based on symmetrical engineering. At the same time, the distance between the optical module and the upper edge of the display panel can still be from 0 to $$\frac{b}{2} + \frac{L\tan\left(\frac{\beta}{2}\right) - \frac{L''}{2}}{\cos\theta},$$

and the distance between the optical module and the lower edge of the display panel can still be from $$\frac{b}{2} - \frac{L\tan\left(\frac{\beta}{2}\right) - \frac{L''}{2}}{\cos\theta},$$

to b.

In some embodiments, considering that the in-vehicle display device 100 is sometimes disposed on an instrument panel 30, and there is a steering wheel between the instrument panel 30 and the driver's head 420, a positional relationship between the optical module 300 and the steering wheel also needs to be taken into consideration. Generally, middle and upper regions of the display panel 200 have a higher light transmittance. When placing the optical module 300, the optical module 300 is installed close to the upper edge of the display panel 200.

Figure 8:
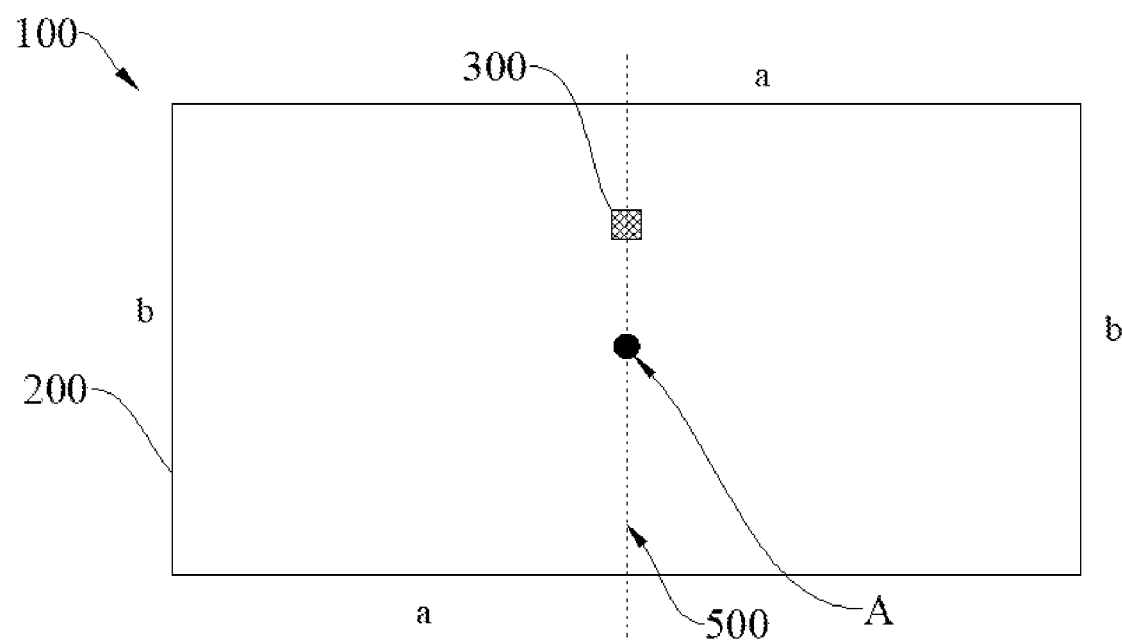
FIG. 8 is a fourth top view of the in-vehicle display device according to one embodiment of the present invention.

Please refer to FIG. 8. In the top view of the in-vehicle display device 100, the distance between the optical module 300 and the geometric center of the display panel 200 is greater than the distance between the optical module 300 and the upper edge of the display panel 200.

In some embodiments, considering that the in-vehicle display device 100 is sometimes disposed on the instrument panel 30. For example, in some new energy vehicles, the instrument panel 30 is disposed at a higher position to display more information, and there is no steering wheel 40 between the instrument panel 30 and the driver's head 420. As a result, the optical module 300 can be arranged near the geometric center of the display panel 200 to achieve comprehensiveness of information collection.

Figure 9:
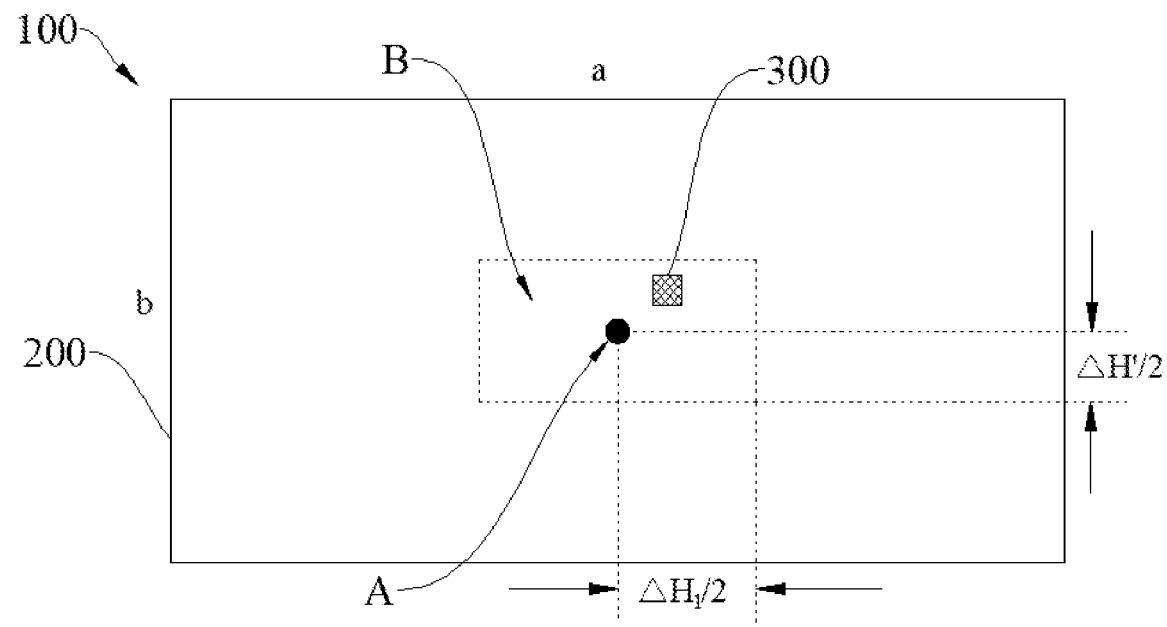
FIG. 9 is a fifth top view of the in-vehicle display device according to one embodiment of the present invention.

As shown in FIG. 9, in the top view of the in-vehicle display device 100, the distance between the optical module 300 and the left edge of the display panel 200 or the distance between the optical module 300 and the right edge of the display panel 200 is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

and the distance between the optical module 300 and the upper edge of the display panel 200 or the distance between the optical module 300 and the lower edge of the display panel 200 is $$\frac{b}{2} - \frac{L\tan\left(\frac{\beta}{2}\right) - \frac{L''}{2}}{\cos\theta}$$

to $$\frac{b}{2} + \frac{L\tan\left(\frac{\beta}{2}\right) - \frac{L''}{2}}{\cos\theta}.$$

An installation area of the optical module 300 is set close to the geometric center of the display panel 200, and the driver is more likely to look at a center area of the display panel 200, thus improving the comprehensiveness of information collection and improving accuracy of information collection.

In some embodiments, the in-vehicle display device 100 is inclined in a direction away from the headrest 410 of the driving seat, and θ is 0° to 20°.

In some embodiments, θ is 10°-15°, and preferably, θ is 13.7° when taking into account the convenience of the driver to view the display panel 200, the convenience of information collection, and the driving safety.

In some embodiments, a is 30° to 60°, and β is 20° to 40°.

In some embodiments, when considering obstructions such as the steering wheel 40, a can be set to 37° to 40°, and β can be set to 25° to 30°. Preferably, a is 38°, and β is 27°.

Figure 10:
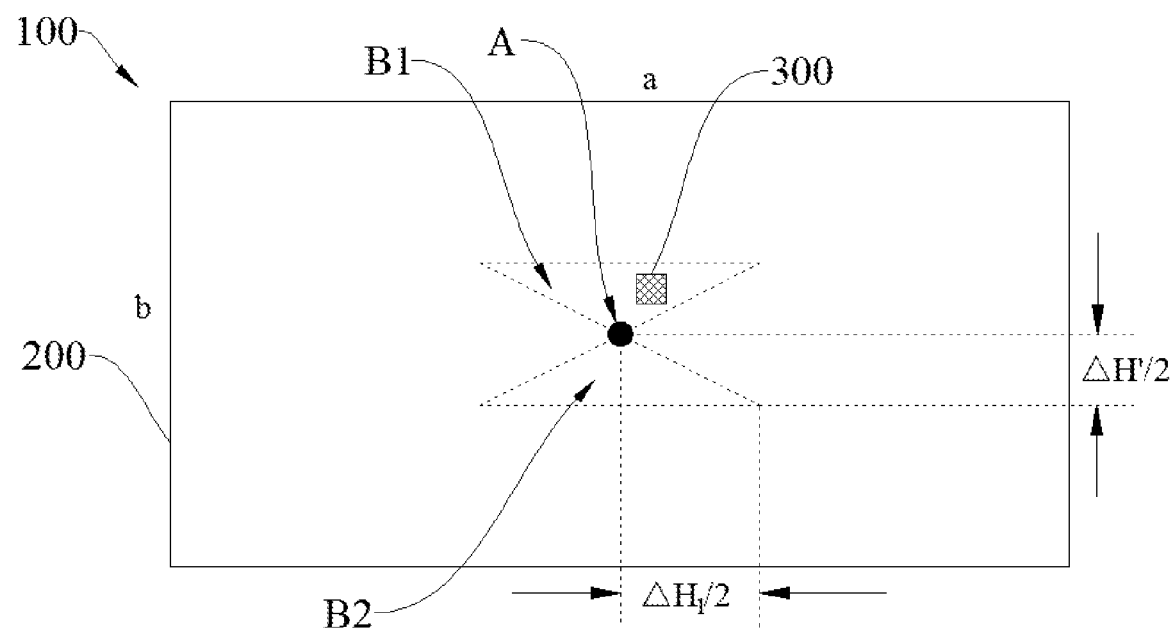
FIG. 10 is a sixth top view of the in-vehicle display device according to one embodiment of the present invention.

Please refer to FIG. 10. In some embodiments, in order to reduce the difficulty in selecting the installation area, the installation area of the optical module 300 is divided into a first area B1 and a second area B2, and the first area B1 and the second area B2 are both an isosceles triangle, a base of the isosceles triangle is parallel to the lower edge of the display panel 200, and an intersection of the two congruent sides of the isosceles triangle is the geometric center A of the display panel 200.

In some embodiments, the present application has only one of the first area B1 and the second area B2 to avoid areas where sightlines are absolutely concentrated.

In some embodiments, taking the second area B2 as an example, a length of the base (not the congruent sides) of the isosceles triangle is 8 cm, and a height is 2 cm for the isosceles triangle having a bottom side which are not the congruent sides as the base. That is, ΔH1/2=4 cm, and ΔH'/2=2 cm.

In some embodiments, the display module is arranged at a position 1 cm to 2 cm upward or downward from the geometric center of the display panel 200. A most concentrated point of human sightlines is generally a geometric center of an object, which needs to impose strict requirements for manufacturing the optical module 300 and the display panel 200, so that the optical module 300 and the display panel 200 can have an integrated appearance, such as an integrated (one-piece) black appearance or a high-definition and high-resolution screen display, and can have sufficient light transmittance. By placing the display module 1 cm to 2 cm upward or downward from the geometric center of the display panel 200, the present application can avoid absolute concentration of the driver's gaze, does not require excessively high technical standards, and can also reduce production difficulty, lower costs, and meet the requirements for sufficient light transmittance.

In some embodiments, the present invention does not specifically limit the size of the display panel 200. For some special vehicles 10, the size of the display panel 200 of the in-vehicle display device 100 can be very large, and the size is, for example, like a transparent windshield. In this case, the installation area of the present invention can be adapted to conform to its setting, or be enlarged or reduced in equal proportions to adapt to the display panel 200 of a special size.

In some embodiments, the optical module 300 comprises any one of a visible light camera, an infrared camera, and a distance sensor. The optical module 300 may be an under-screen module of the display panel 200, wherein the infrared camera has a lower requirement for light transmittance than that of a visible light camera, which can improve the accuracy of light information collection.

In some embodiments, the display panel 200 can be a liquid crystal display panel 200 or a self-luminous display panel 200, such as an OLED display panel 200, an AMOLED display panel 200, a QLED display panel 200, a Mini-LED display panel 200, and a Micro-LED display panel 200, and the present application is not limited in this regard.

In some embodiments, the display panel 200 is a liquid crystal display panel 200 as an example for simple structural illustration.

The in-vehicle display device 100 is installed in a vehicle and used in a driving monitoring system. The vehicle-mounted display device 100 has a display function and a shooting function, which can meet the requirements of the driver monitor system for continuous driving and driver status monitoring.

The in-vehicle display device comprises a backlight module, a first polarizer, and a second polarizer. The display panel has a non-display light-transmissive area and a display area. The display area is located at a periphery of the non-display light-transmissive area. The backlight module is located at a back side of the light-emitting surface of the display panel, and the backlight module is provided with a second through hole corresponding to the non-display light-transmissive area, and the second through hole penetrates the backlight module.

The optical module is arranged in the second through hole. That is to say, the optical module is located at the back side of the light-emitting surface of the display panel and is arranged corresponding to the non-display light-transmissive area. The first polarizer is disposed between the backlight module and the display panel, the second polarizer is disposed on one side of the display panel away from the first polarizer, and the first polarizer and the second polarizer are attached at two opposite sides in the display panel.

The display panel comprises an array substrate, a liquid crystal layer disposed on the array substrate, and a color filter layer disposed on the liquid crystal layer.

In some embodiments, the display panel further comprises electrode layers located at two sides of the liquid crystal layer.

In some embodiments, the display panel further comprises a spacer layer between the liquid crystal layer and a color filter layer. The spacer layer can control a cell thickness and provide a level difference to protect the display panel.

In some embodiments, the array substrate comprises an active layer, a gate insulating layer on the active layer, a gate layer on the gate insulating layer, an interlayer insulating layer on the gate layer, and a source-drain layer disposed on the interlayer insulating layer.

In some embodiments, the color filter layer comprises a plurality of red color resists, a plurality of green color resists, a plurality of blue color resists, and light-shielding units disposed between adjacent color resists.

In some embodiments, the in-vehicle display device 100 further comprises a backlight module disposed at one side of a backplate of the display panel 200. The backlight module includes a light source and a light diffusion unit.

According to the distance between the optical module and the headrest of the driving seat, the viewing angle of the optical module, the normalized size of the driver's head, the arrangement angle of the in-vehicle display device, and scene modeling, the present invention plans an installed position of the optical model in the in-vehicle display device, thereby facilitating gathering information and monitoring interaction, improving driving safety of a driver, and improving traffic safety.

Figure 11:
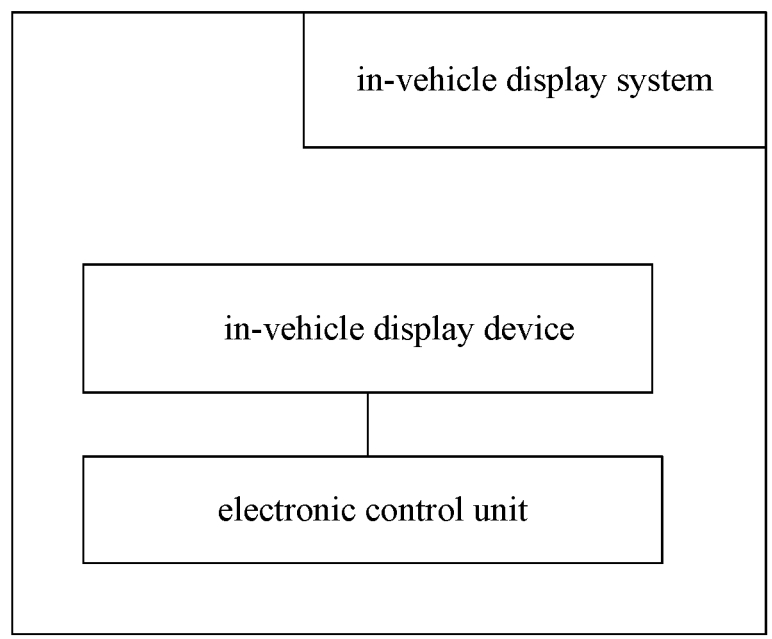
FIG. 11 is a structural diagram illustrating the in-vehicle display system according to one embodiment of the present invention.

Referring to FIG. 11, the present invention also provides an in-vehicle display system, comprising the in-vehicle display device 100 as described above. The in-vehicle display system further comprises an electronic control unit connected to the in-vehicle display device 100 for controlling the interaction between the in-vehicle display device 100 and other components.

The technical solutions of the present invention are described in conjunction with specific embodiments.

In some embodiments, the in-vehicle display system further comprises a driving assistance system, which is connected to the electronic control unit, and is used to collect information about a surrounding environment of the vehicle and display the collected information through the in-vehicle display device 100.

In some embodiments, the in-vehicle display system further comprises a vehicle information interaction unit. The vehicle information interaction unit is connected to the electronic control unit through a vehicle bus and is used to transmit vehicle information and display the vehicle information through the in-vehicle display device 100.

For example, scenes around a vehicle or object recognition information for intelligent driving assistance can be displayed on the in-vehicle display device 100 through the in-vehicle display system, so as to enhance the driver's experience (driving pleasure) and improve driving safety.

Figure 12:
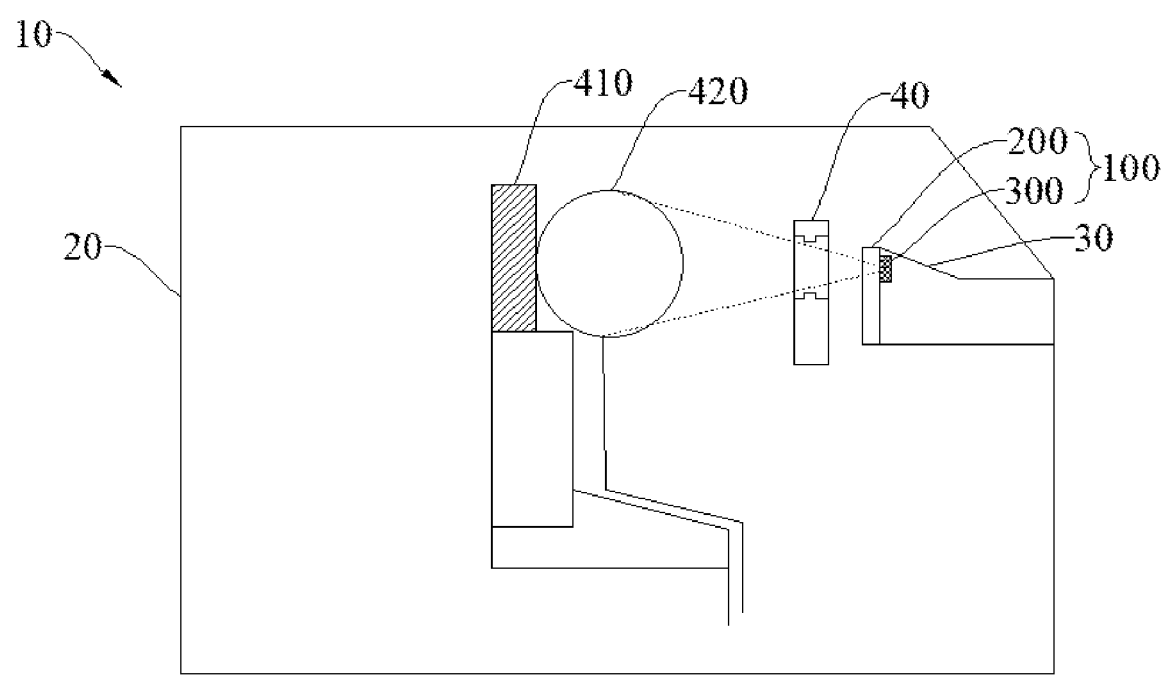
FIG. 12 is a structural view illustrating a vehicle according to one embodiment of the present invention.

Referring to FIG. 12, the present invention further provides a vehicle 10, which comprises a cabin 20 and the in-vehicle display device 100 as described above, and the in-vehicle display device 100 is disposed in the cabin 20.

The technical solution of the present invention is described in conjunction with specific embodiments.

In some embodiments, the cabin 20 comprises the instrument panel 30 and a driving seat. The driving seat comprises the headrest 410 and a backrest, and the instrument panel 30 is located in front of the driver.

In some embodiments, the in-vehicle display device 100 can be arranged on the instrument panel 30 to facilitate information collection of the driver in the driving seat.

In some embodiments, the cabin 20 further comprises a steering wheel 40. The steering wheel 40 can be disposed in a connection line between the in-vehicle display device 100 and the driver's head 420, or can be disposed outside the connection line between the in-vehicle display device 100 and the driver's head 420, and configurations can vary according to different vehicle models.

In some embodiments, the cabin 20 further comprises a center console, and the in-vehicle display device 100 can also be disposed on the center console.

In some embodiments, the cabin 20 further comprises a front windshield, and the in-vehicle display device 100 can also be arranged on the front windshield. The in-vehicle display device 100 needs to be a transparent display. A specific structure of the transparent display is not the point of the present invention, and is not specifically defined here.

The present application provides an in-vehicle display device, an in-vehicle display system, and a vehicle. The in-vehicle display device comprises a display panel and an optical module. In a top view of the in-vehicle display device, a distance between the optical module and a left edge of the display panel or a distance between the optical module and a right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2}.$$

A distance between the optical module and an upper edge of the display panel is from 0 to $$\frac{b}{2} + \frac{L\tan\left(\frac{\beta}{2}\right) - \frac{L''}{2}}{\cos\theta},$$

and a distance between the optical module and a lower edge of the display panel is from $$\frac{b}{2} - \frac{L\tan\left(\frac{\beta}{2}\right) - \frac{L''}{2}}{\cos\theta}$$

to b. According to the distance between the optical module and the headrest of the driving seat, the viewing angle of the optical module, the normalized size of the driver's head, the arrangement angle of the in-vehicle display device, and scene modeling, the present invention plans an installed position of the optical model in the in-vehicle display device, thereby facilitating gathering information and monitoring interaction, improving driving safety of a driver, and improving traffic safety.

It can be understood that those of ordinary skill in the art can make equivalent replacements or changes according to the technical solutions and inventive concepts of the present application. Such changes or replacements shall be deemed to fall within the protection scope of the appended claims of the present application.

What is claimed is:

1. An in-vehicle display device, wherein the in-vehicle display device comprises a display panel and an optical module;
wherein in a top view of the in-vehicle display device, a distance between the optical module and a left edge of the display panel or a distance between the optical module and a right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

a distance between the optical module and an upper edge of the display panel is from 0 to $$\frac{b}{2} + \frac{L\tan\left(\frac{\beta}{2}\right) - \frac{L''}{2}}{\cos\theta},$$

and a distance between the optical module and a lower edge of the display panel is from $$\frac{b}{2} - \frac{L\tan\left(\frac{\beta}{2}\right) - \frac{L''}{2}}{\cos\theta}$$

to b, wherein L is a distance between the optical module and a geometric center of a headrest of a driving seat, L' is a normalized width of a driver's head in a horizontal direction, L" is a normalized length of the driver's head in a vertical direction, $\alpha$ is a horizontal viewing angle of the optical module, $\beta$ is a vertical viewing angle of the optical module, $\theta$ is an arrangement angle between the in-vehicle display device and a vertical plane, a is a normalized length of the display panel in the horizontal direction, and b is a normalized length of the display panel in a direction perpendicular to the horizontal direction in a plane where the display panel is located.

2. The in-vehicle display device according to claim 1, wherein the optical module is arranged on one side of the display panel away from the headrest of the driving seat, and a normal line of a light-receiving surface of the optical module is parallel to a normal line of a display surface of the display panel.

3. The in-vehicle display device according to claim 1, wherein in a top view of the in-vehicle display device, the display panel comprises a first symmetry axis, the first symmetry axis passing through a geometric center of the display panel and is perpendicular to the lower edge of the display panel, and the optical module is disposed in the first symmetry axis.

4. The in-vehicle display device according to claim 3, wherein in the top view of the in-vehicle display device, a distance between the optical module and the geometric center of the display panel is greater than the distance between the optical module and the upper edge of the display panel.

5. The in-vehicle display device according to claim 1, wherein in the top view of the in-vehicle display device, the distance between the optical module and the left edge of the display panel or the distance between the optical module and the right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) + \frac{L'}{2},$$

and the distance between the optical module and the upper edge of the display panel or the distance between the optical module and the lower edge of the display panel is from $$\frac{b}{2} - \frac{L\tan\left(\frac{\beta}{2}\right) - \frac{L''}{2}}{\cos\theta}$$

to $$\frac{b}{2} + \frac{L\tan\left(\frac{\beta}{2}\right) - \frac{L''}{2}}{\cos\theta}.$$

6. The in-vehicle display device according to claim 1, wherein the in-vehicle display device is inclined in a direction away from the headrest of the driving seat, and $\theta$ is 0° to 20°.

7. The in-vehicle display device according to claim 1, wherein $\alpha$ is 30° to 60°, and $\beta$ is 20° to 40°.

8. The in-vehicle display device according to claim 1, wherein the optical module comprises any one of a visible light camera, an infrared camera, and a distance sensor.

9. The in-vehicle display device according to claim 1, wherein the optical module is installed in a first area and a second area, the first area and the second area are both an isosceles triangle, a base of the isosceles triangle is parallel to the lower edge of the display panel, and an intersection of two congruent sides of the isosceles triangle is a geometric center of the display panel.

10. An in-vehicle display system, comprising an in-vehicle display device, wherein the in-vehicle display device comprises a display panel and an optical module;

wherein in a top view of the in-vehicle display device, a distance between the optical module and a left edge of the display panel or a distance between the optical module and a right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

a distance between the optical module and an upper edge of the display panel is from 0 to $$\frac{b}{2} + \frac{L\tan\left(\frac{\beta}{2}\right) - \frac{L''}{2}}{\cos\theta},$$

and a distance between the optical module and a lower edge of the display panel is from $$\frac{b}{2} - \frac{L\tan\left(\frac{\beta}{2}\right) - \frac{L''}{2}}{\cos\theta}$$

to b, wherein L is a distance between the optical module and a geometric center of a headrest of a driving seat, L' is a normalized width of a driver's head in α horizontal direction, L" is a normalized length of the driver's head in a vertical direction, α is a horizontal viewing angle of the optical module, β is a vertical viewing angle of the optical module, θ is an arrangement angle between the in-vehicle display device and a vertical plane, a is a normalized length of the display panel in the horizontal direction, and b is a normalized length of the display panel in a direction perpendicular to the horizontal direction in a plane where the display panel is located;
wherein the in-vehicle display system also comprises an electronic control unit connected to the in-vehicle display device for controlling interaction between the in-vehicle display device and other components.

11. The in-vehicle display system according to claim 10, wherein the in-vehicle display system further comprises a driving assistance system, the driving assistance system is connected to the electronic control unit and is configured to collect vehicle surrounding environment information and display the vehicle surrounding environment information through the in-vehicle display device.

12. The in-vehicle display system according to claim 10, wherein the in-vehicle display system further comprises a vehicle information interaction unit, the vehicle information interaction unit is connected to the electronic control unit through a vehicle bus, and the vehicle information interaction unit is configured to transmit vehicle information and display the vehicle information through the in-vehicle display device.

13. A vehicle, comprising a cabin and an in-vehicle display device, wherein the in-vehicle display device is arranged in the cabin;

wherein the in-vehicle display device comprises a display panel and an optical module;
wherein in a top view of the in-vehicle display device, a distance between the optical module and a left edge of the display panel or a distance between the optical module and a right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

a distance between the optical module and an upper edge of the display panel is from 0 to $$\frac{b}{2} + \frac{L\tan\left(\frac{\beta}{2}\right) - \frac{L''}{2}}{\cos\theta},$$

and a distance between the optical module and a lower edge of the display panel is from $$\frac{b}{2} - \frac{L\tan\left(\frac{\beta}{2}\right) - \frac{L''}{2}}{\cos\theta}$$

to b, wherein L is a distance between the optical module and a geometric center of a headrest of a driving seat, L' is a normalized width of a driver's head in a horizontal direction, L" is a normalized length of the driver's head in a vertical direction, α is a horizontal viewing angle of the optical module, β is a vertical viewing angle of the optical module, θ is an arrangement angle between the in-vehicle display device and a vertical plane, a is a normalized length of the display panel in the horizontal direction, and b is a normalized length of the display panel in a direction perpendicular to the horizontal direction in a plane where the display panel is located.

14. The vehicle according to claim 13, wherein the optical module is arranged on one side of the display panel away from the headrest of the driving seat, and a normal line of a light-receiving surface of the optical module is parallel to a normal line of a display surface of the display panel.

15. The vehicle according to claim 13, wherein in a top view of the in-vehicle display device, the display panel comprises a first symmetry axis, the first symmetry axis passing through a geometric center of the display panel and is perpendicular to the lower edge of the display panel, and the optical module is disposed in the first symmetry axis.

16. The vehicle according to claim 15, wherein in the top view of the in-vehicle display device, a distance between the optical module and the geometric center of the display panel is greater than the distance between the optical module and the upper edge of the display panel.

17. The vehicle according to claim 13, wherein in the top view of the in-vehicle display device, the distance between the optical module and the left edge of the display panel or the distance between the optical module and the right edge of the display panel is from $$\frac{a}{2} - L\tan\left(\frac{\alpha}{2}\right) + \frac{L'}{2}$$

to $$\frac{a}{2} + L\tan\left(\frac{\alpha}{2}\right) - \frac{L'}{2},$$

and the distance between the optical module and the upper edge of the display panel or the distance between the optical module and the lower edge of the display panel is from $$\frac{b}{2} - \frac{L\tan\left(\frac{\beta}{2}\right) - \frac{L''}{2}}{\cos\theta}$$

to $$\frac{b}{2} + \frac{L\tan\left(\frac{\beta}{2}\right) - \frac{L''}{2}}{\cos\theta}.$$

18. The vehicle according to claim 13, wherein a is 30° to 60°, and β is 20° to 40°.

19. The vehicle according to claim 13, wherein the optical module comprises any one of a visible light camera, an infrared camera, and a distance sensor.

20. The vehicle according to claim 13, wherein the cabin comprises an instrument panel located in front of the driver, and the in-vehicle display device is disposed on the instrument panel.

* * * * *